UNITED STATES PATENT OFFICE.

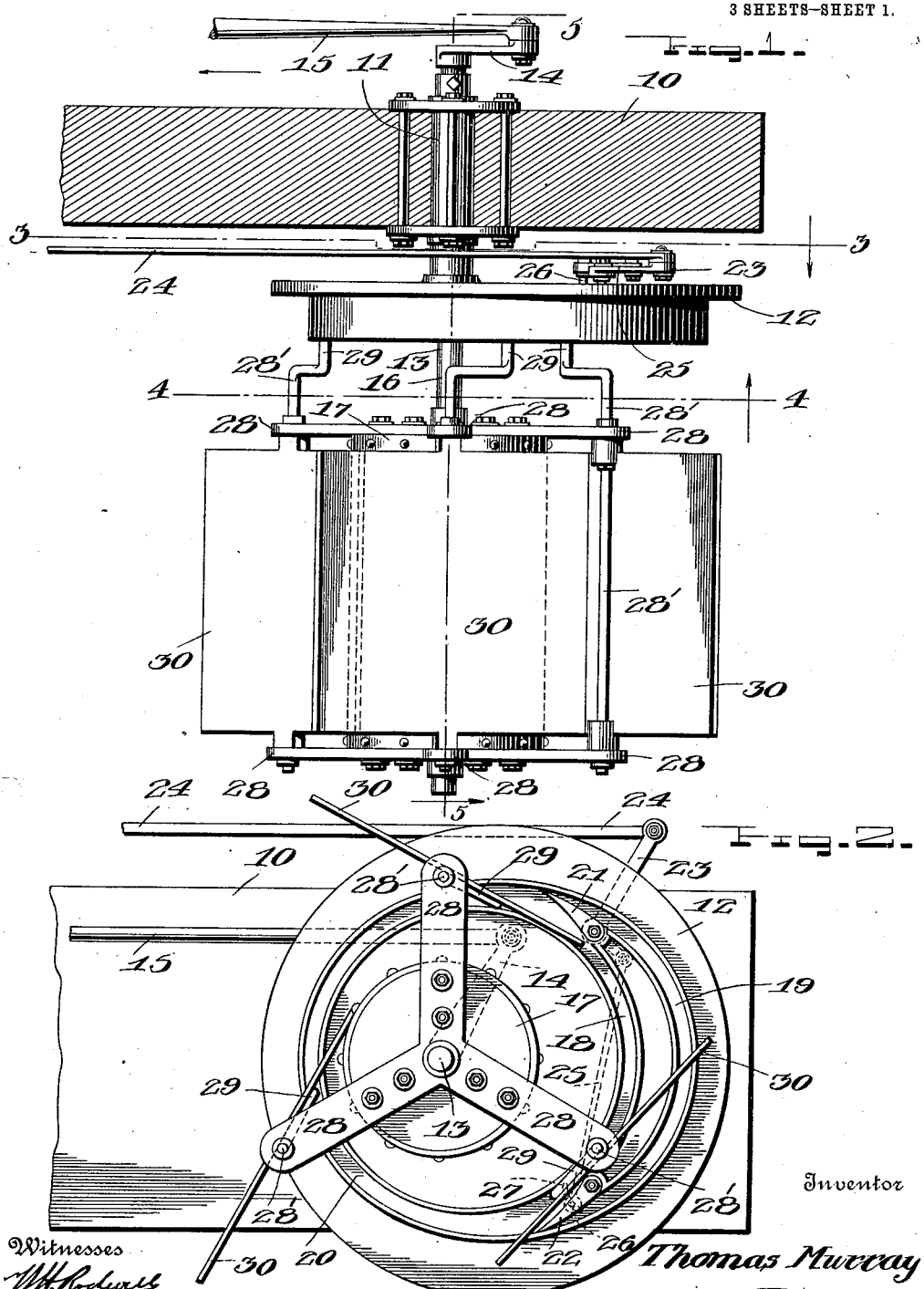

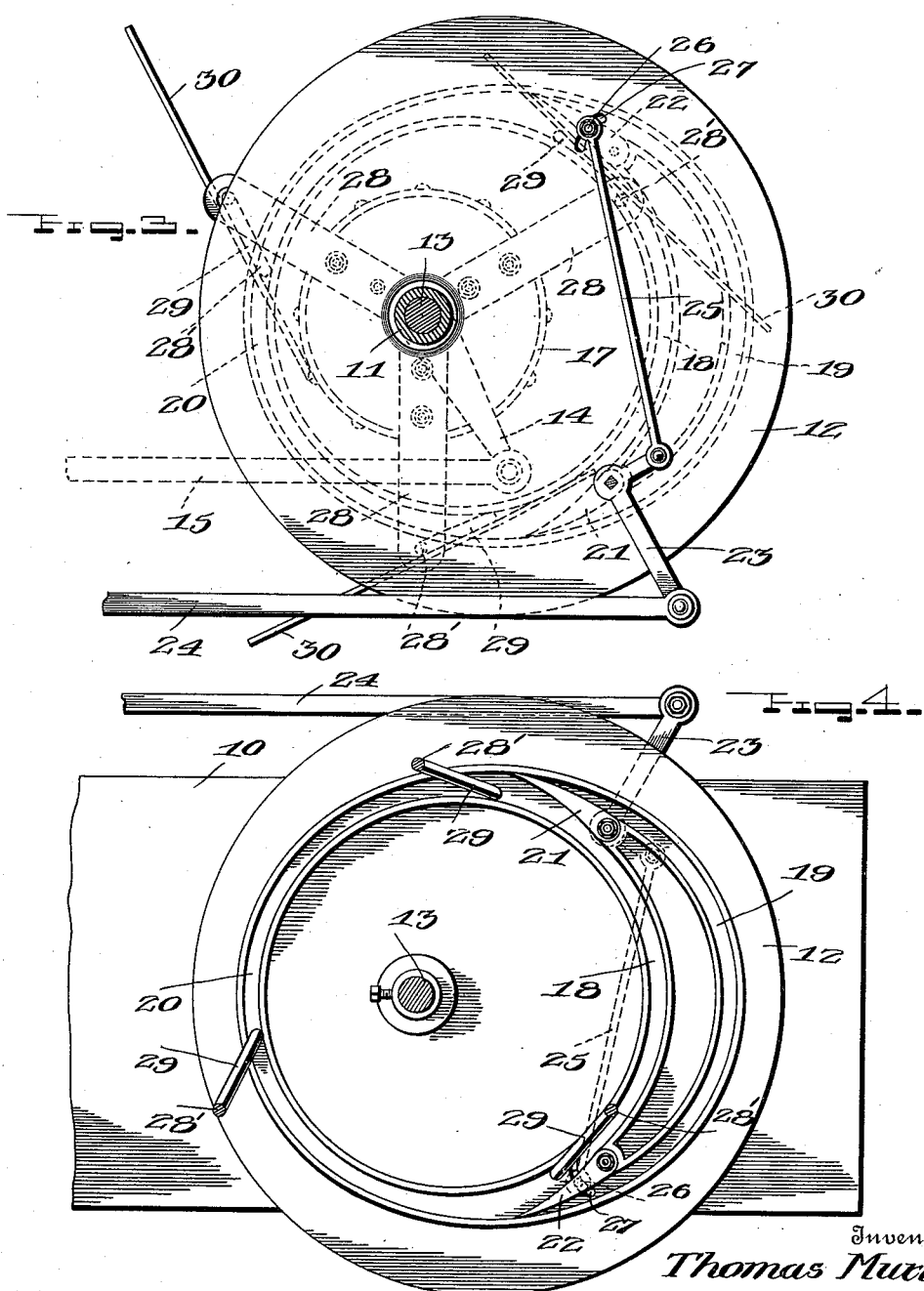

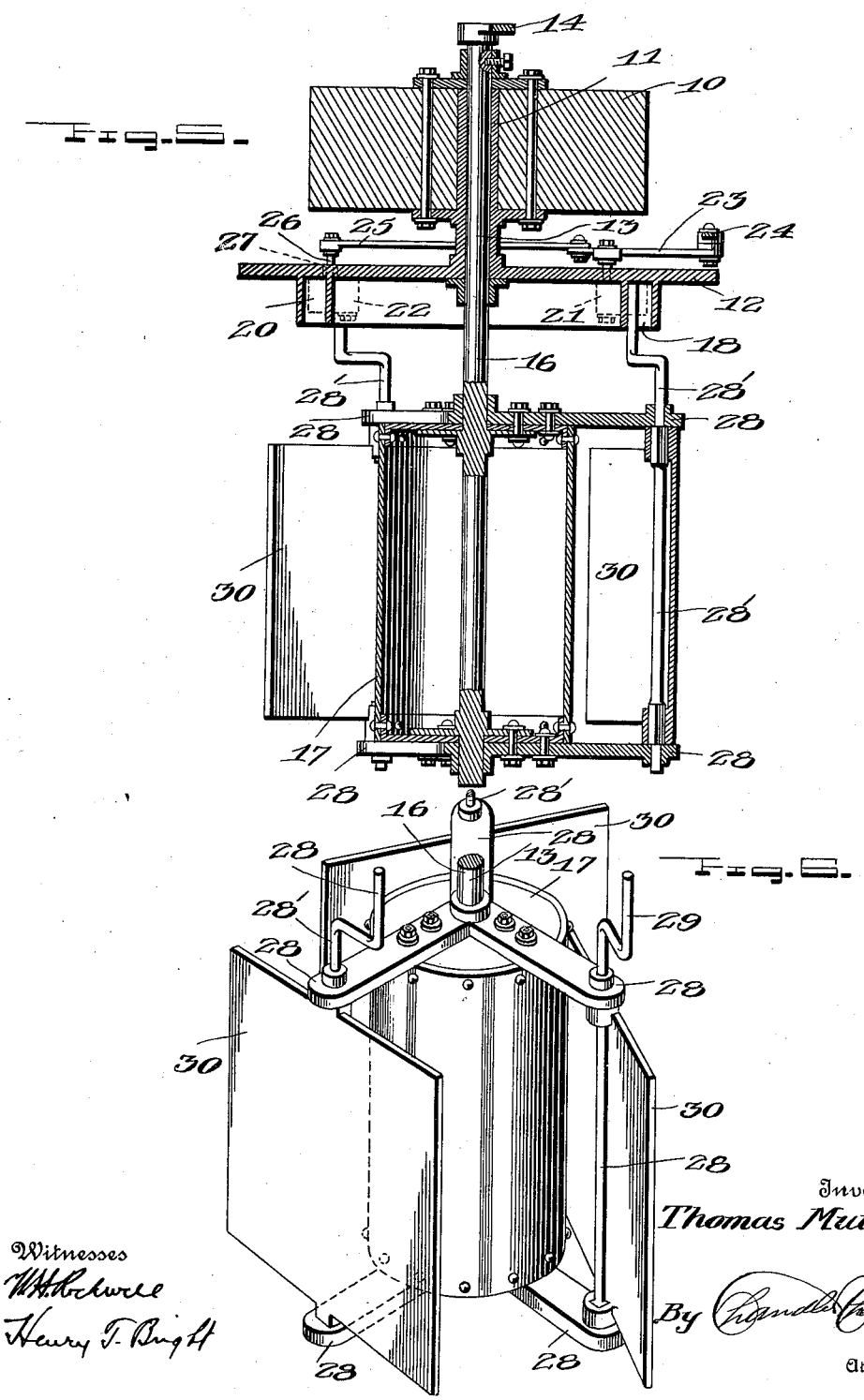

THOMAS MURRAY, OF GROTON, NEW YORK.

PROPELLER.

1,008,857.

Specification of Letters Patent. Patented Nov. 14, 1911.

Application filed August 17, 1911. Serial No. 644,524.

*To all whom it may concern:*

Be it known that I, THOMAS MURRAY, a citizen of the United States, residing at Groton, in the county of Tompkins, State of New York, have invented certain new and useful Improvements in Propellers; and I do hereby declare the following to be a full, clear, and exact description of the invention, such as will enable others skilled in the art to which it appertains to make and use the same.

This invention relates to propellers.

The object of the invention resides in the provision of a propeller of the feathering blade type which may be utilized with efficiency as an aid to water or air navigation and includes improved means for feathering the blades and also improved means for respectively reversing the action of the wheel when rotated in opposite direction.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote like corresponding parts in the several views, in which—

Figure 1 is a view showing the propeller operatively applied to the frame timber of a boat, the latter being shown in section. Fig. 2 a bottom view of what is shown in Fig. 1. Fig. 3 a section on line 3—3 of Fig. 1. Fig. 4 a section on line 4—4 of Fig. 1. Fig. 5 a section on the line 5—5 of Fig. 1, and Fig. 6 a fragmental detail perspective view of the wheel frame which carries the feathering blades and showing the manner of mounting the latter upon said wheel frame.

Referring to the drawings 10 indicates a frame timber of a boat and fixed in this timber is a sleeve 11 which has formed on its lower end an annular flange 12. Rotatable mounted in the sleeve 11 is a shaft 13, the upper end of which terminates in a crank arm 14 which is suitably connected by a link 15 with an engine not shown, whereby said shaft is rotated. The lower end of the shaft 13 is extended beyond the outer face of the flange 12, as at 16 and mounted on this extension 16 in a fixed manner is a drum 17. Formed on the outer face of the flange 12 by other and downwardly projecting flanges are guideways 18 and 19 which have a common portion 20, said guideways 18 and 19 and the common portion 20 being disposed eccentrically to the shaft 13 and the sleeve 11.

In order to control communication between either of the guideways 18 and 19 and the common portion 20 thereof, there is pivotally mounted on the flange 12 at each end of said guideways 18 and 19 switch points 21 and 22. The movement of these switch points outwardly will close communication between the guideway 19 and the common portion 20 while the opposite movement of said switch points will close communication between the guideway 18 and the common portion 20. The movement of these switches is simultaneously accomplished in the former direction by means of an angle lever 23 which is fixed on the pivotal connection of the switch point 21 and disposed against the inner face of the flange 12. One arm of this lever 23 is connected by means of a link 24 with a suitable lever disposed in a convenient location upon the boat whereby the movement of said lever will produce a corresponding movement of the angle lever 23 and effect the desired movement of the switch point 21. This movement of the angle lever just referred to is also transmitted to the switch point 22 by means of a link 25 connected to the other arm of said lever and also to a projection 26 on the switch point 22 extending through an arcuate slot 27 in the flange 12. By this construction it will be apparent that when the angle lever 23 is operated in one direction the switch points 21 and 22 will be moved outwardly with respect to the flange 12 and close communication between the guideway 19 and the common portion 20 while the opposite movement of said lever 23 will simultaneously move the switch points 21 and 22 inwardly and close communication between the guideway 18 and the common portion 20.

Carried at each end of the drum 17 is a plurality of correspondingly disposed radial arms 28 and rotatably mounted between the corresponding arms carried at each end of the drum 17 are shafts 28'. The ends of each of the flanges 28' which are disposed jacent the flange 12 are offset as at 29 and the outer end of the offset portion 29 of each shaft is positioned for travel in the eccentrically disposed guideways so that during the rotation of the shaft 13 the offset portions 29 will coöperate with the guideways in which they are traveling to produce certain desired rotation of that portion of the shafts 28' disposed between the arms 28. Centrally fixed upon each of the shafts 28' is a blade 30. These blades as will be apparent respond to the rotation of the shafts 28' under the influence of the coaction between the offset portions 29 and the guideways in which said offset portions are traveling. This movement of the blades 30 in response to said movement of the shafts 28' serves to effect the feathering of said blades so as to gain the greatest power therefrom on their active stroke and create the least resistance on their return or inactive stroke.

While the invention has been shown as applied to a boat it will be apparent that same can be applied with equal facility to an air craft without in any manner changing the construction thereof.

What is claimed is:

1. The combination of a supporting part, a sleeve fixed in said supporting part having an annular flange at one end, a pair of guideways on the outer face of said flange disposed eccentric to the sleeve and having a common portion, a shaft rotatably mounted in said sleeve and extended at one end beyond the outer face of the flange, a cylindrical drum fixed on the extended portion of the shaft, corresponding radial arms carried by the drum at each end, shafts rotatably mounted between corresponding arms, said shafts having their ends adjacent the flange offset and extended respectively for travel in said guideways during the rotation of the first named shaft, a blade centrally fixed to each of said second named shafts, and means for directing the offset portion of said second named shafts from the common portion of the guideways into either of the uncommon portions thereof during the rotation of the first named shaft.

2. The combination of a supporting part, a sleeve fixed in said supporting part having an annular flange at one end, a pair of guideways on the outer face of said flange disposed eccentric to the sleeve and having a common portion, a switch point pivotally mounted on said flange at each end of the uncommon portions of said guideways adapted to control communication between the common portion of the guideways and the uncommon portions thereof, a common means for simultaneously operating said switch points to close communication between the common portion of the guideway and opposite ends of an uncommon portion, a shaft rotatably mounted within said sleeve and extended beyond the outer face of said flange, a wheel fixed on the extended portion of said shaft, centrally pivoted blades carried by said wheel, and means fixed to each of said blades and extending into the guideways for coöperation with the latter during the rotation of the shaft to feather the blades.

In testimony whereof, I affix my signature, in presence of two witnesses.

THOMAS MURRAY.

Witnesses:
ROBT. BYLE,
JOHN J. HARE.

---

Copies of this patent may be obtained for five cents each, by addressing the "Commissioner of Patents. Washington, D. C."